P. WRIGHT.
Car Wheel.
No. { 2,912, 33,916. }
2 Sheets—Sheet 2.
Patented Dec. 10, 1861.
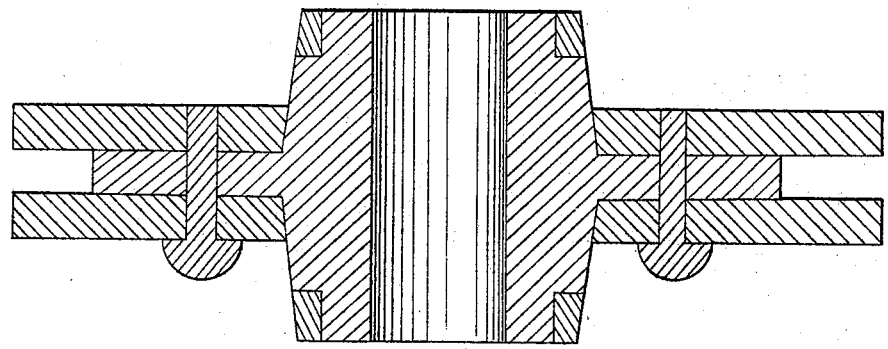
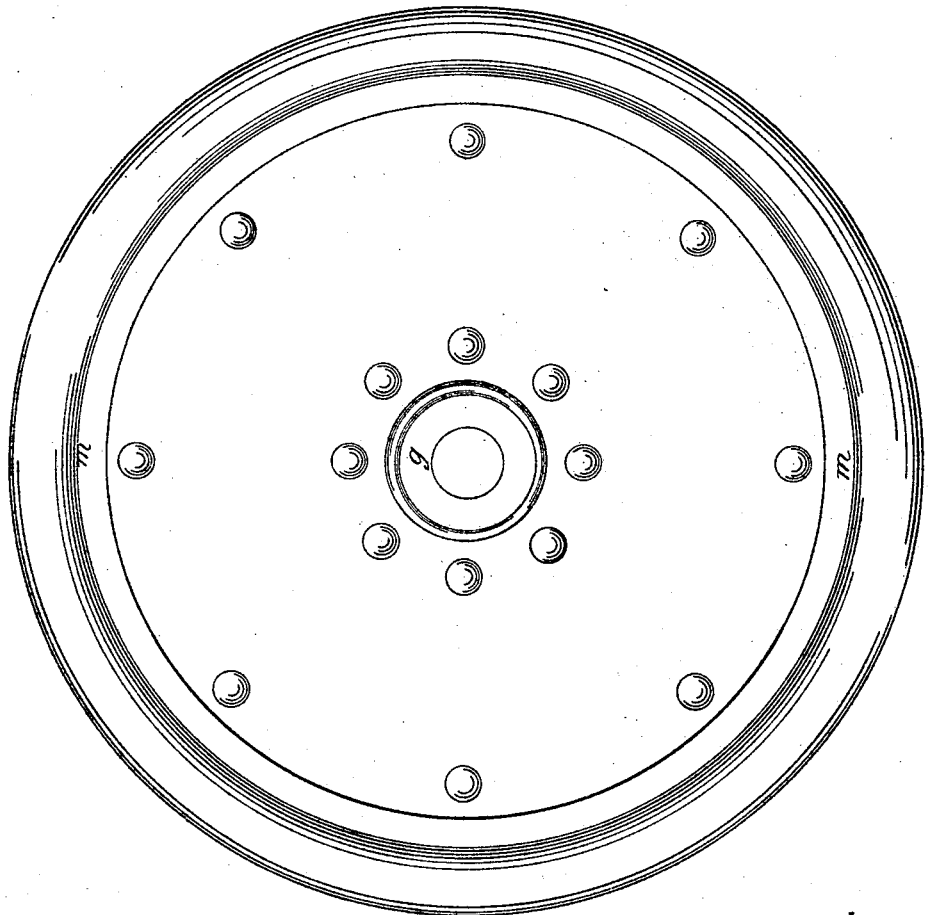
Witnesses:
Edmund Mafson
Daniel Doland
Inventor:
Peter Wright
Per Atty
Samuel Cooper
per Roach

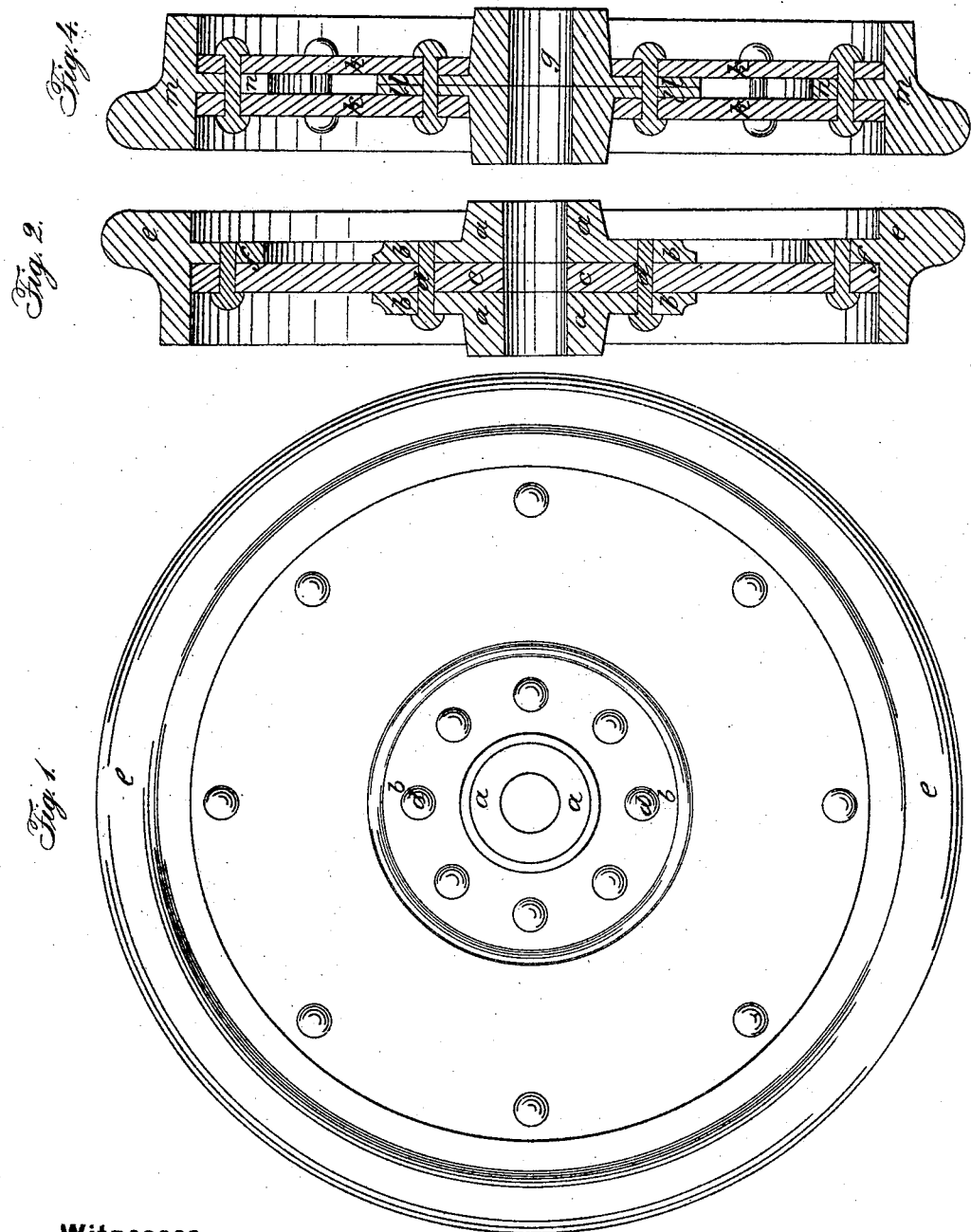

UNITED STATES PATENT OFFICE.

PETER WRIGHT, OF DUDLEY, COUNTY OF WORCESTER, ENGLAND.

IMPROVEMENT IN WHEELS.

Specification forming part of Letters Patent No. 33,916, dated December 10, 1861.

*To all whom it may concern:*

Be it known that I, PETER WRIGHT, of Dudley, in the county of Worcester, England, a subject of Her Britannic Majesty, have invented certain Improvements in Wheels; and I do hereby declare that the following is a full and exact description of my said invention—that is to say:

I first prepare a die of the requisite section to give the desired form of one-half of the nave of the wheel, with a flange upon the periphery of the thickest part of the nave. I then take wrought or scrap iron and heat it in a furnace until it is ready for my purpose, when I lay it in the die and force it into the die by blows from a steam or forge hammer or by pressure applied until the heated metal completely fills the die. I then remove the metal from the die and take it to a hydraulic or other suitable press, by which a hole is made through the center for the axle. The corresponding half of the nave is then formed in the same manner. I then take a disk or circular plate of the requisite size and thickness, through the center of which a hole is cut corresponding with the hole through the nave. This disk is placed between the two halves of the nave and the whole is riveted or bolted together; or, in another way, I can take two disks of plate-iron, and, placing them one on each side of the flange upon the nave, I rivet or bolt them together through the flange, or when a lighter wheel is required segmental pieces or arms may be riveted or bolted onto or between and through the flange upon the nave in place of the solid disk. The next operation is that of fixing on the tire, which may be effected in various ways, either by riveting or bolting the disk or center part of the wheel to a flange formed on the inner periphery of the tire or by riveting T or angle iron upon the rim of the center part, when the tire may be shrunk on and secured in the usual manner or by any other approved mode.

I will now proceed to a more detailed description of my invention by the aid of the accompanying drawings.

In the drawings, Figure 1 is an elevation, and Fig. 2 a vertical section, of one of my single-disk wheels; Fig. 3, an elevation, and Fig. 4 a vertical section, of one of my double-disk wheels. Fig. 5 shows an enlarged section of one of my cast naves.

A A, Fig. 2, show the boss or nave of the wheel formed in two parts and in the following manner: I prepare a die sunk to the requisite cutting to mold one-half of this nave to the form I require, with its flange, as seen at $b\ b$, formed solid upon it. I now take wrought or scrap iron in a heated state, with which I fill the die, forcing the metal into the die by blows from a steam or forge hammer or by hydraulic or other pressure until the die can contain no more metal. I then remove the blank in a die corresponding to that in which it was formed, but with an opening in the bottom, for a purpose to be presently described, to a hydraulic press. This press is fitted with a punch upon the head of the ram, which, descending upon the heated nave, forces a plug of metal through the center and out at the bottom of the die, leaving a hole of the necessary size for the reception of the axle, and, having in this manner prepared two precisely similar mouldings from the die, I proceed to the manufacture of the disk which is to form the body of the wheel, and for this purpose I take a plate of wrought-iron or boiler-plate, and by any of the ordinarily-practiced methods of cutting circular disks in metal I shape the plate to the size and outline I require, and I then cut or punch or press through the center of this disk an aperture exactly coinciding in size and form with that which I have already made in the halves of the nave $c\ c$. Fig. 2 shows this disk, which is now to be placed between the two parts $a\ a$ forming the nave, in which position the disk is to be firmly secured by bolts or rivets $d\ d$, driven through the flanges $b\ b$, and consequently through the disk $c$. Also, $e\ e$ represent the tire formed with a flange $f\ f$ entirely round its inner periphery. This tire having been previously prepared in the form of a hoop, the rest of the wheel is brought to it and laid within it upon the flange $f\ f$ and the whole is secured together by being bolted or riveted through the flange $f$ and the disk $c$.

I will now describe the construction of the wheel shown by Figs. 3 and 4, and referring to the vertical section, Fig. 4, it will be seen that this form of wheel consists of two disks $k$ $k$, between which disks both the flanges upon the nave and that upon the tire are secured. The nave $g$ for this wheel is formed in manner precisely similar to that in the wheel last described, with the single exception that as the two flanges $e$ $e$ are in this instance to be brought closely together it is unnecessary to make those flanges of such strength, as in the former case each of the disks $k$ $k$, also two being employed, may be much lighter than that shown in Fig. 2. The two halves of the nave $g$ having been prepared in the manner I have already described are to be brought into close contact, so that the flanges $l$ $l$ exactly coincide. The disks $k$ $k$ are then made ready and an aperture is cut through the center of each sufficiently large to admit the nave $g$ up to the flanges $l$ $l$. The tire $m$ $m$, with its flange $n$ $n$, is the next part requiring to be placed, and, this being done, one disk is fitted on each side of the flanges $l$ $l$ $n$ $n$ and the whole of the parts are bolted or riveted together, as shown.

It is not necessary that the form for the body of either of the wheels I have described should be that of a solid disk or plate. The plate may be perforated into a number of arms or segments or in various designs and still be secured together by the means I have specified. Thus a wheel may be produced for many purposes as efficient as the solid wheel, and although it would be wanting in some measure in the strength possessed by the solid center it would still form a very strong, light, and ornamental wheel.

I may state that I am not necessarily compelled to employ a flange upon the inner periphery of the tire as the only means by which I can secure the disk or disks to the tire, for I can attain the same result, though probably with rather more trouble, by riveting iron of T or angular section upon the rim of the body or disk of the wheel and afterward shrinking on the tire and securing it in any sufficient manner; neither am I bound to the employment of wrought or scrap iron only in the formation of the boss or nave, for in Fig. 5 I have represented a form of cast-iron nave which may also be made in two parts, though I prefer making it in one, as shown in the drawings secured to the disk or body, as in making the wheels shown in Figs. 3 and 4. A hoop or band of wrought-iron is then shrunk on each side of the nave, keeping the nave from bursting when keyed upon the axle.

My improvements in machinery or apparatus to be used in this manufacture consist in adapting and employing a peculiar construction of dies of a section suitable for molding or striking the parts of the boss or nave, and also in the application of a punch fitted upon the head of the ram of a hydraulic press, or punch or strike out the hole for the axle; but as this portion of my invention may be thoroughly understood from the previous description of the manufacture of those parts, further particulars are unnecessary.

Having thus described the nature of my said invention and in what manner the same is to be practically carried out, in conclusion I would remark that I am quite aware that wheels having a single disk secured to a flange upon the inner periphery of the tire are not new, and I therefore lay no claim to this mode of securing a single-disk wheel to its tire; but, without limiting myself to precise details,

I claim—

1. The formation of the bosses or naves of wheels in manner herein described.

2. The mode of combining or connecting together, as herein described, the several parts of wheels, with the exception of that portion of the single-disk wheel already alluded to.

3. The manufacture of wheels with cast-iron bosses or naves formed and secured as herein described.

PETER WRIGHT.

Witnesses:
J. M. G. UNDERHILL,
FREDERICK JOHN CONNELL.